UNITED STATES PATENT OFFICE.

WILLIAM BUTTLER, OF WASHINGTON, PENNSYLVANIA.

METHOD OF DECORATING GLASS ARTICLES.

SPECIFICATION forming part of Letters Patent No. 460,358, dated September 29, 1891.

Application filed May 16, 1891. Serial No. 392,957. (No model.)

*To all whom it may concern:*

Be it known that I, WILLIAM BUTTLER, of Washington, in the county of Washington and State of Pennsylvania, have invented a new and useful Improvement in Methods of Decorating Glass Articles, of which the following is a full, clear, and exact description.

The object of my invention is to provide a cheap and efficient method for applying to glass articles coloring-matter, either to the whole surface of the article or to a part only thereof.

It consists of dipping the article or a suitable part thereof into a bath of molten colored glass of such composition that it fuses at less temperature than the glass material of which the article itself is composed. The colored glass adheres to the surface of the article in a thin film, and when the article is withdrawn will remain thereon permanently without liability of being broken or spalled off.

In the practice of my invention I melt in a suitable pot in a melting-furnace a colored-glass batch of low fusing-point, and when the batch is quite liquid I dip the finished glass article into it and then remove it. A colored glass film adheres to the article, and when the latter has cooled the operation is complete. It is desirable that the glass article when dipped into the molten glass should be nearly of the same temperature as the latter.

The invention may be used for ornamenting a great variety of articles of glassware, such as goblets, bowls, lantern-globes, chimneys, &c. It is especially desirable in applying an annular rim of color to the top of a lamp-chimney. To do this I prefer to employ a small open-top furnace heated by gas and filled with checker-work in which an open melting-pot is contained. The batch is melted in this pot and the chimney, finished or crimped, is introduced downwardly into it by means of a snap. I may use a vertical standard, and a stop on the snap may operate in conjunction with the standard to limit the extent of immersion of the chimney into the bath. Other articles may be treated in like manner.

A suitable batch is composed of glass of the following composition: red oxide of lead, one part, by weight; boracic acid or borax, one part, by weight; glass-maker's sand, four parts, by weight. Glass of this composition melts at a cherry-red heat, and when fused becomes very liquid, so that it is especially adapted for my purpose. Suitable coloring-matter may be added to give the batch any desired tint. Other suitable glass-baths of low fusing-temperature may be devised by those skilled in the art, and my invention, broadly considered, is not limited to the batch of the particular composition mentioned.

The means with which the method may be practiced is also susceptible of modifications in various ways to suit the shape of the article or other conditions of use.

I claim—

1. The method of decorating glass articles, which consists in dipping such article when heated into a fluid molten vitreous bath composed of glass of lower fusing-temperature and then permitting the article to cool, substantially as described.

2. The method of decorating glass articles, which consists in dipping such article when finished into a molten vitreous bath composed of glass of lower fusing-temperature and then permitting the article to cool, substantially as described.

3. The method of decorating glass articles, which consists in dipping a portion only of such article when heated into a fluid molten vitreous bath composed of glass of lower fusing-temperature and then permitting the article to cool, substantially as described.

In testimony whereof I have hereunto set my hand this 14th day of May, A. D. 1891.

WILLIAM BUTTLER.

Witnesses:
 DAVID S. MCCANN,
 T. W. BAKEWELL.